US012757062B2

(12) United States Patent
Paul et al.

(10) Patent No.: US 12,757,062 B2
(45) Date of Patent: Oct. 6, 2026

(54) SMART 5G EDGE IMPROVING EXPERIENCE AND PERFORMANCE OF APPLICATIONS OVER 5G NETWORKS

(71) Applicant: Accenture Global Solutions Limited, Dublin (IE)

(72) Inventors: Sanjoy Paul, Sugar Land, TX (US); Shalini Choudhury, Highland Park, NJ (US)

(73) Assignee: Accenture Global Solutions Limited, Dublin (IE)

( * ) Notice: Subject to any disclaimer, the term of this patent is extended or adjusted under 35 U.S.C. 154(b) by 322 days.

(21) Appl. No.: 18/466,151

(22) Filed: Sep. 13, 2023

(65) Prior Publication Data

US 2024/0089784 A1 Mar. 14, 2024

Related U.S. Application Data

(60) Provisional application No. 63/406,198, filed on Sep. 13, 2022.

(51) Int. Cl.
*G06F 15/173* (2006.01)
*H04L 47/2466* (2022.01)
(Continued)

(52) U.S. Cl.
CPC ..... *H04W 28/0236* (2013.01); *H04L 47/2466* (2013.01); *H04L 47/2475* (2013.01); *H04W 28/0263* (2013.01)

(58) Field of Classification Search
CPC ......... H04W 28/0263; H04W 28/0268; H04W 72/12; H04W 72/54; H04W 72/543; H04L 47/2466; H04L 47/2475
See application file for complete search history.

(56) References Cited

U.S. PATENT DOCUMENTS

| | | | | |
|---|---|---|---|---|
| 11,540,298 B2 * | 12/2022 | Kotaru | .............. | H04W 72/0453 |
| 2020/0205050 A1 * | 6/2020 | Shah | ................. | H04W 36/0005 |

(Continued)

FOREIGN PATENT DOCUMENTS

WO WO-2020011375 A1 * 1/2020 ............ H04L 47/32

*Primary Examiner* — Suraj M Joshi
*Assistant Examiner* — Hao H Nguyen
(74) *Attorney, Agent, or Firm* — Seed Intellectual Property Law Group LLP

(57) ABSTRACT

Example computer-implemented methods, media, and systems for improving experience and performance of applications over 5G networks are disclosed. One example computer-implemented method includes establishing multiple signaling message quality of service (QoS) flows of an application over a communications network. Multiple data message QoS flows of the application are established over the communications network. The multiple signaling message QoS flows are sent to a user device through an ultra-reliable low latency communication (URLLC) slice over the communications network. The multiple data message QoS flows are sent to the user device through an enhanced multimedia broadband (eMBB) slice of the communications network. The multiple signaling message QoS flows are mapped to first multiple data radio bearers (DRBs). The multiple data message QoS flows are mapped to second multiple DRBs. One or more services associated with the application are provided to the user device based on the first and the second multiple DRBs.

20 Claims, 5 Drawing Sheets

(51) Int. Cl.
*H04L 47/2475* (2022.01)
*H04W 28/02* (2009.01)

(56) References Cited

U.S. PATENT DOCUMENTS

| | | | | |
|---|---|---|---|---|
| 2020/0383043 | A1 | 12/2020 | Wei et al. | |
| 2021/0160729 | A1* | 5/2021 | Agiwal | H04W 28/0263 |
| 2022/0263561 | A1* | 8/2022 | Bao | H04B 7/063 |
| 2022/0369000 | A1* | 11/2022 | Bouazizi | H04S 7/302 |
| 2023/0337037 | A1* | 10/2023 | Xu | H04W 24/08 |
| 2024/0155416 | A1* | 5/2024 | He | H04W 28/0263 |
| 2024/0196376 | A1* | 6/2024 | Wang | H04W 24/02 |
| 2024/0365170 | A1* | 10/2024 | Taneja | H04W 28/0268 |
| 2025/0024316 | A1* | 1/2025 | Xue | H04W 28/0252 |
| 2025/0184781 | A1* | 6/2025 | Xu | H04W 36/0044 |
| 2025/0203601 | A1* | 6/2025 | Bush | H04W 56/002 |
| 2025/0300771 | A1* | 9/2025 | Kaimalettu | H04L 5/0055 |

* cited by examiner

300

SMART 5G EDGE IMPROVING EXPERIENCE AND PERFORMANCE OF APPLICATIONS OVER 5G NETWORKS

CROSS-REFERENCE TO RELATED APPLICATION

This application claims the benefit of U.S. Provisional Application No. 63/406,198, filed Sep. 13, 2022, and titled "Smart 5G Edge Improving Experience and Performance of Applications over 5G Networks," which is incorporated herein by reference.

TECHNICAL FIELD

The present disclosure relates to computer-implemented methods, media, and systems for improving experience and performance of applications over 5G networks.

BACKGROUND

Applications are frequently hosted in cloud platforms, whereby applications are executed on remote servers and data is streamed to user devices over one or more networks. Such cloud-based applications have quality of service (QoS) requirements, for example, low latency interactive applications, extreme high bandwidth applications, and/or highly reliable applications. Degradation in QoS can result in user experience or performance issues over commercially available networks, such as 5G networks. For example, virtual reality (VR) applications have increased in popularity. A user can interact with a VR application using a VR headset, which includes a display, speakers, user input devices, and the like. A user may experience delay when a VR game is played over a network, even a modern network, such as a 5G network. In some instances, delay can be excessive, especially when the network is loaded with many users and does not have the capacity to serve the VR game application while meeting QoS requirements. Furthermore, when the user moves from one network cell to another, it may become difficult to maintain the QoS. Additionally, the wireless channel conditions can change with time and cause the QoS to fluctuate.

SUMMARY

The present disclosure involves computer-implemented methods, media, and systems for well completion for unconventional subsurface reservoirs using multivariate imputed data. One example computer-implemented method includes establishing multiple signaling message quality of service (QoS) flows of an application over a communications network, where the multiple signaling message QoS flows include multiple signaling packets of the application. Multiple data message QoS flows of the application are established over the communications network, where the multiple data message QoS flows include multiple data packets of the application. The multiple signaling message QoS flows are sent to a user device through an ultra-reliable low latency communication (URLLC) slice over the communications network. The multiple data message QoS flows are sent to the user device through an enhanced multimedia broadband (eMBB) slice of the communications network. The multiple signaling message QoS flows are mapped to first multiple data radio bearers (DRBs). The multiple data message QoS flows are mapped to second multiple DRBs. One or more services associated with the application are provided to the user device based on the first multiple DRBs and the second multiple DRBs.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

Like reference numbers and designations in the various drawings indicate like elements.

DETAILED DESCRIPTION

Figure 1:
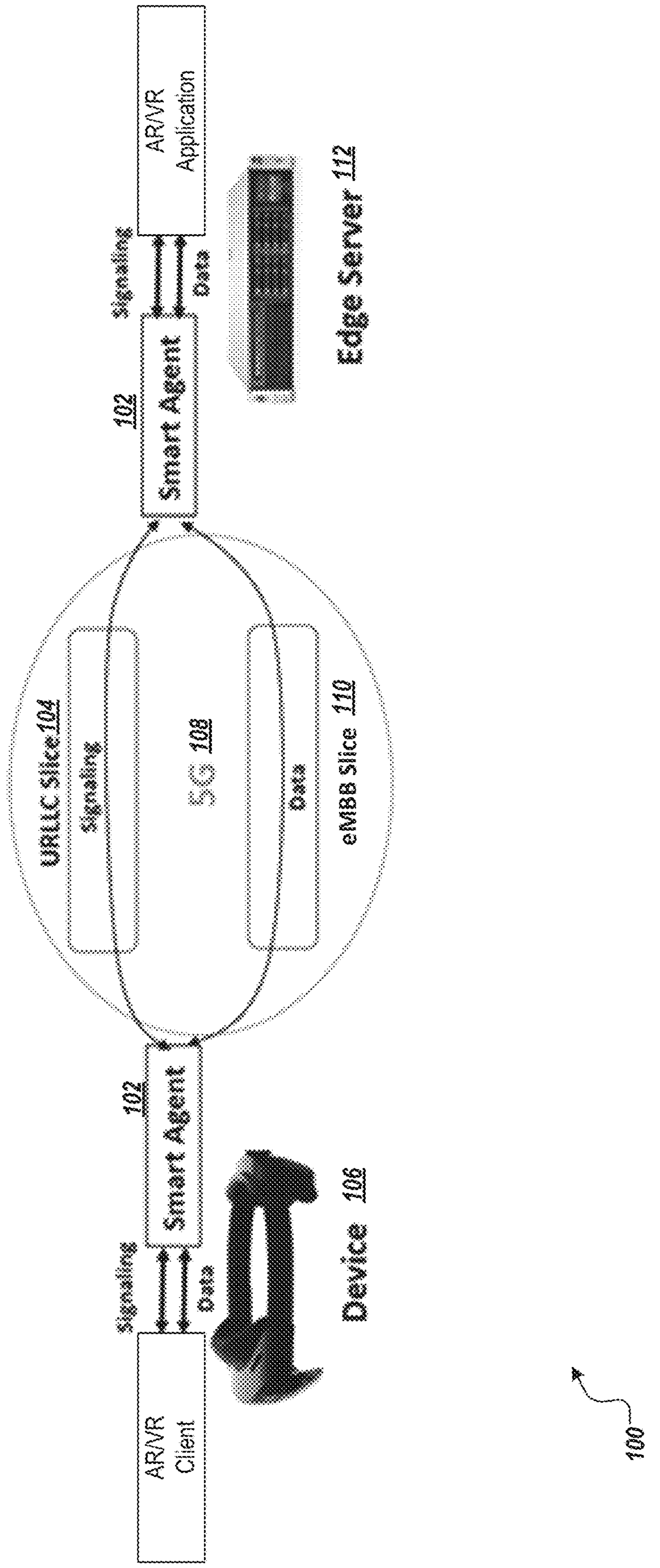
FIG. 1 depicts an example use case in accordance with implementations of the present disclosure.

Implementations of the present disclosure are generally directed to improving quality of service (QoS) and user experience in cloud-based applications that stream to one or more end-user devices. In some examples, implementations of the present disclosure include 5G edge devices that interface with a 3rd Generation Partnership Project (3GPP) compliant 5G wireless network on one hand and an application server on the other hand and improving user experience and performance of applications over 5G networks. Steps involved in improving user experience and performance of an application over a 5G network can include (1) identifying the QoS requirements of an application, (2) identifying the flows corresponding to the application, where the flows can include a set of packets associated with the application, (3) mapping the QoS requirements of the flows to appropriate network slices with desired characteristics, (4) performing signaling (compliant with the 3GPP+ standards) with the corresponding virtual network functions (VNFs) to set up the flows through a 5G-network, 5) de-multiplex the flows from the application and multiplex them back at the user equipment (UE), and (6) dynamically adapting the network slices to the application flows.

It is appreciated that methods in accordance with the present disclosure can include any combination of the aspects and features described herein. That is, for example, apparatus and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

Implementations of the present disclosure are described in further detail herein with reference to an example use case. The example use case includes using an end-to-end (E2E) QoS architecture leveraging 5G slicing to improve experience and performance of applications over 5G networks. For example, a signaling flow is isolated from a data flow and sent through a highly reliable network slice, while the data packets are sent over high-bandwidth network slice for media-heavy applications. It is contemplated, however, that implementations of the present disclosure can be realized with any appropriate use case.

While 5G and 5G networks are referenced herein, it is contemplated that implementations of the present disclosure can be realized with any appropriate generation of communications technology and/or network. Further, while implementations of the present disclosure are illustrated by way of example with reference to augmented reality (AR)/virtual reality (VR) devices, it is contemplated that implementations of the present disclosure can be executed to realize improvements with any appropriate end-user devices (e.g., laptop computers, desktop computers, smartphones).

FIG. 1 depicts an example use case 100 in accordance with implementations of the present disclosure. In the example of FIG. 1, an AR/VR device 106 communicates with an edge server 112 through 5G network 108 that serves as a channel or link between AR/VR device 106 and edge server 112. To establish a connection between AR/VR device 106 and edge server 112 for an AR/VR application, for example, an AR/VR training application, first a signaling flow over 5G network 108 is established between AR/VR device 106 and edge server 112, then a data flow over 5G network 108 begins between AR/VR device 106 and edge server 112. A flow can be a set of packets in 5G network 108. For an AR/VR application, the signaling flow can include 1) real-time streaming protocol (RTSP) control, 2) game control, 3) augmented, virtual, and mixed reality technologies (collectively XR) state and XR collaboration, and 4) haptics, and the data flow can include audio and video data associated with the AR/VR application.

In some examples, a smart agent 102 can be deployed between AR/VR device 106 and edge server 112. Smart agent 102 acts as a proxy for AR/VR device 106 and edge server 112, relaying the signaling flow and the data flow between AR/VR device 106 and edge server 112 and over 5G network 108. Smart agent 102 can use an ultra-reliable low latency communication (URLLC) slice of 5G network 108 for relaying the signaling flow and an enhanced multimedia broadband (eMBB) slice of 5G network 108 for relaying the data flow. 5G network slicing is a network architecture that enables the multiplexing of virtualized and independent logical networks on the same physical network infrastructure. Each network slice is an isolated end-to-end network tailored to fulfil diverse requirements requested by a particular application. For example, the URLLC slice used for relaying the signaling flow is ultra-reliable in that the probability of losing the signaling flow is extremely low. This improves user experience by quickly setting up the connection, and therefore dramatically reduces the latency observed by the user. Furthermore, by using the eMBB slice for relaying the data flow, high bandwidth can be ensured for video, images, and 3D models. The high bandwidth associated with the eMBB slice also improves user experience in terms of faster delivery and rendition of artifacts in AR.

Figure 2:
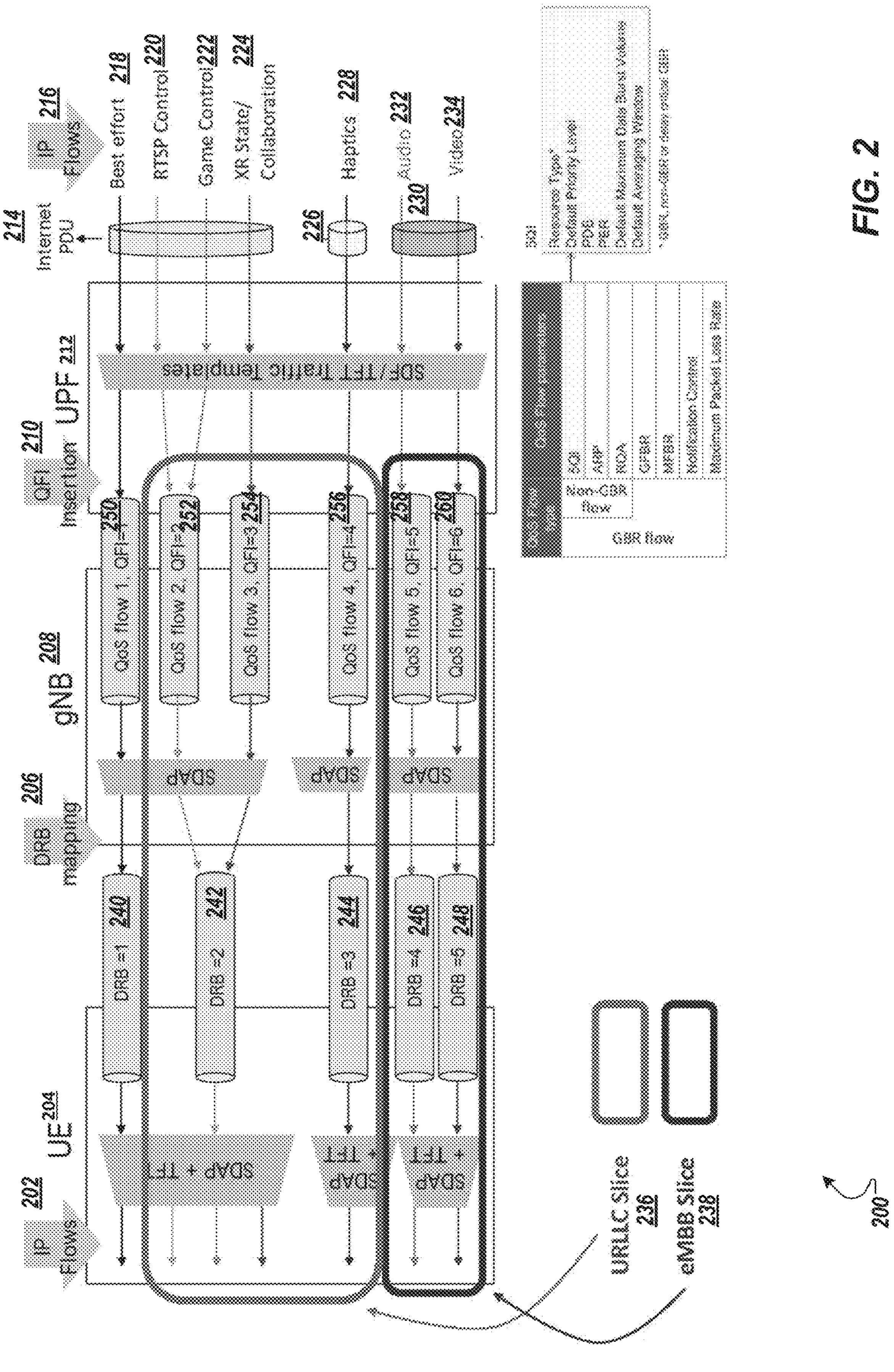
FIG. 2 depicts an example architecture in accordance with implementations of the present disclosure.

FIG. 2 depicts an example architecture 200 in accordance with implementations of the present disclosure. In the example of FIG. 2, a 5G end-to-end QoS architecture is used together with 5G network slicing for a VR use case. This architecture can enable the alignment of network configuration policies, for example, provisioning and management of QoS, across the entire network to ensure E2E network performance.

As shown in FIG. 2, URLLC slice 236 is used to relay a signaling flow that includes RTSP control 220, game control 222, XR state/collaboration 224, and haptics 228. The signaling flow in this VR use case is part of IP flows 216. RTSP control 220, game control 222, XR state/collaboration 224 are part of internet protocol data unit (PDU) 214, and haptics 228 is part of PDU 226. RTSP control 220 and game control 222 are mapped to QoS flow 152, XR state/collaboration 224 is mapped to QoS flow 154, and haptics 228 is mapped to QoS flow 256. QoS flow 252 and QoS flow 254 are mapped to data radio bearer (DRB) 242, and QoS flow 256 is mapped to DRB 244. A QoS flow is the lowest level granularity within a 5G system and is where policy and charging are enforced. QoS is enforced at the QoS flow level.

As shown in FIG. 2, eMBB slice 238 is used to relay a data flow that includes audio 232 and video 234. The data flow in this VR use case is part of IP flows 216. Audio 232 and video 234 are part of PDU 230, and are mapped to QoS flow 258 and QoS flow 260 respectively. These two QoS flows are in turn mapped to DRB 246 and DRB 248 respectively.

In some examples, by combining 5G QoS and 5G slicing, the example architecture 200 can provide secure and reliable connectivity with QoS configured for AR/VR application flows meeting user experience and application performance requirements. This architecture can also provide end-to-end orchestration and provisioning extending out to device and up into the Cloud. The 5G slicing in this architecture can also be used to segregate maintenance, repair, and operation (MRO) training data from other data over the network to provide enhanced QoS. Architecture 200 can provide end-to-end internet protocol (IP) extending from 5G network to devices that support it, into edge compute through 5G User Plane Function (UPF) and up into the Cloud, and therefore simultaneously meet the MRO maintainer/training functional requirements and enhance E2E network performance due to more efficient routing. This architecture can also be used to explore radio optimizations including mapping of QoS flows to different DRB s, optimizing physical frame structure, and mapping traffic to different frequencies (e.g., mmWave, citizens broadband radio service). By leveraging fine grained network slicing in 5G, architecture 200 can be used to simultaneously optimize distributed applications such as AR for performance, service levels and cost, factoring in device, compute, storage and networking resources.

Figure 3:
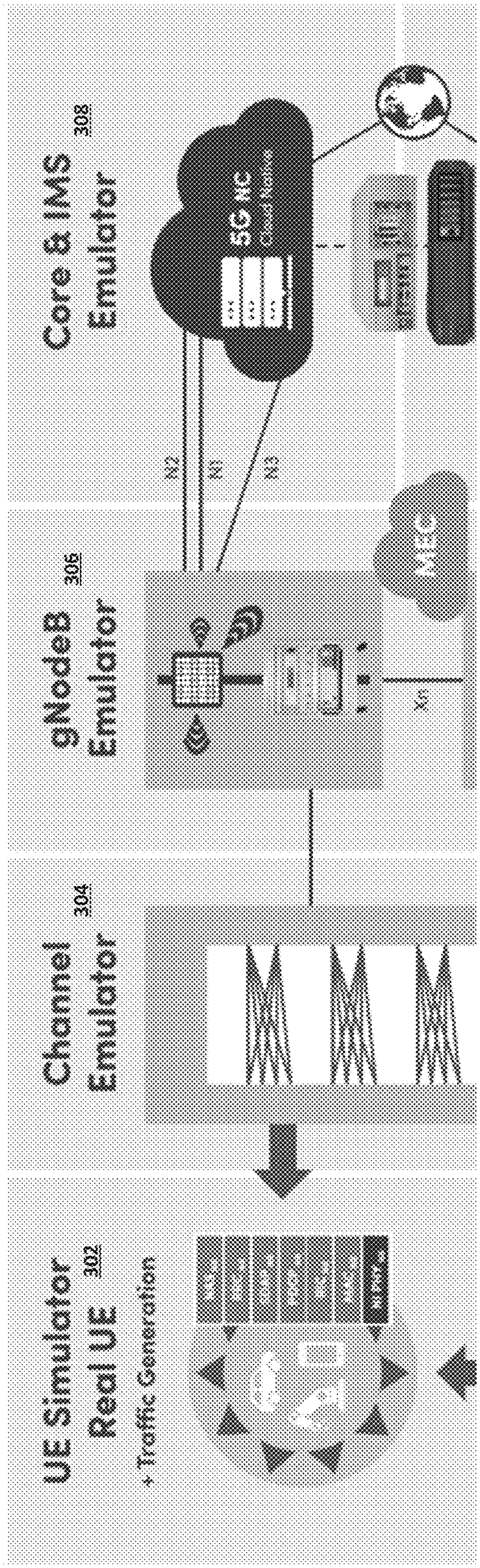
FIG. 3 depicts an example system in accordance with implementations of the present disclosure.

FIG. 3 depicts an example system 300 in accordance with implementations of the present disclosure. In some examples, example system 300 is provided using one or more computer-executable programs executed by one or more computing devices.

In some examples, by simulating traffic of a 5G AR system on an emulator of a 5G network (user equipment (UE) <-> channel <-> base station (gNodeB) <-> core), performance study and QoS evaluation of the 5G AR system can be performed, and values of various parameters, for example, resolution of the content (video, images, 3D models) under various scenarios (high load, high mobility, lower coverage etc.) can be determined. These determined parameters can then be applied in real deployment. In some examples, an emulated 5G network can be used to emulate a 5G network and can be generated using an emulator of a 5G network that includes channel emulator 304, gNodeB emulator 306, and core and IP multimedia subsystem (IMS) emulator 308.

In some examples, example system 300 can allow evaluation of the performance (including the user experience) of an application under various network conditions, ranging from physical-layer (e.g., wireless transmission channel) impairments to link-layer (e.g., handoff), network-layer (e.g., latency, jitter and loss), transport layer (e.g., multi-rate streaming), all the way to the application layer (e.g., frequent scene changes). It can also be used to analyze the impact of the aforementioned phenomena on the performance of the application, in isolation or in combination, and provide recommendations on how to build and deploy the application to improve its performance when it is used on 5G or other networks.

In some examples, example system 300 can enable exploration (e.g., modeling, simulating, and analysis) of an application under various deployment architectures with distributed compute, storage, and network resources and constraints (e.g., capacity, latency, and costs). Example system 300 can also enable determination of how to architect an AR application to place specialized computing resources (e.g., GPU, FPGA, and inference) to support encoding/decoding of media (e.g., 3D models, video, images etc.) and rendering, how to choose service profiles (e.g., eMBB and URLLC) and slices in 5G, and how to use edge compute.

In some examples, the example system 300 can simultaneously optimize across service levels, performance, user experience, security, and cost.

In some examples, container orchestration platform (e.g., Kubernetes™) based open-source implementations of 5G radio access network (RAN) and 5G core network, as well as network simulators can be used to model, simulate and optimize compute, storage, and network resources and constraints (e.g., capacity and costs), and determine how to architect an AR application, whether to render at the end-device or at the edge and stream from the edge to the end-device, factoring in performance benefits of 5G and edge compute. Actual performance data can also be used to calibrate and improve the example system 300.

In some examples, example system 300 can be used to evaluate the addition of another application that uses edge and 5G network resources, including how the addition of the other application will impact an AR application, and recommend deployment approaches, resource allocations and how to handle the co-existence of multiple applications.

In some examples, example system 300 can be used to 1) analyze existing techniques used for modeling and simulation of AR, 5G, and distributed cloud applications, 2) explore different modeling and simulation approaches and algorithms to support AR applications, 3) evaluate compute and network performance and resource utilization, 4) test and evolve AR/VR system architecture for improving the end-to-end performance of the AR/VR system and the user experience, taking into account the flows, latency, jitter, packet loss, bandwidth, compute resources, and other system-level constraints, and critical optimization criteria, 5) develop an engine for modeling, simulating (using open-source RAN and core network software, and network simulator), and optimizing AR applications along with other distributed and dynamic applications topologies (e.g. micro-services, containers, container orchestration platforms, and serverless), and 6) test and continuously refine the ability of example system 300 to analyze and provide recommendations on how to build and deploy application and resources to improve performance. Specifically, model and analyze the placement of specialized edge compute resources (e.g., GPU, FPGA, and inference) to support media transcoding (e.g., 3D models, video, images), analytics, and artificial intelligence (AI)/machine learning (ML).

Figure 4:
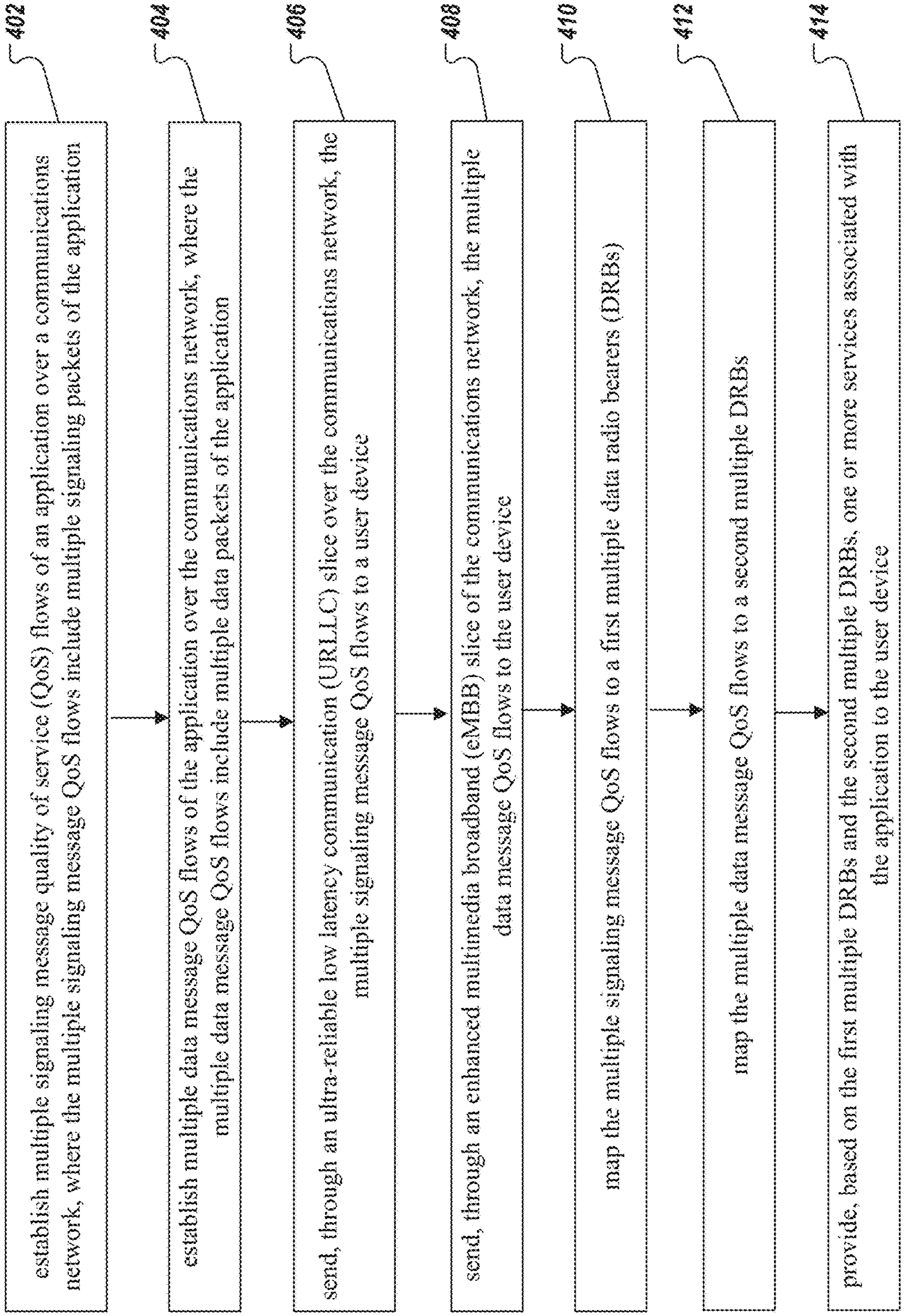
FIG. 4 depicts an example process that can be executed in accordance with implementations of the present disclosure.

FIG. 4 depicts an example process 400 that can be executed in accordance with implementations of the present disclosure.

At 402, a computer system establishes multiple signaling message quality of service (QoS) flows of an application over a communication network, where the multiple signaling message QoS flows include multiple signaling packets of the application.

At 404, the computer system establishes multiple data message QoS flows of the application over the communication network, where the multiple data message QoS flows include multiple data packets of the application.

At 406, the computer system sends, through an ultra-reliable low latency communication (URLLC) slice over the communication network, the multiple signaling message QoS flows to a user device.

At 408, the computer system sends, through an enhanced multimedia broadband (eMBB) slice of the communication network, the multiple data message QoS flows to the user device.

At 410, the computer system maps the multiple signaling message QoS flows to a first multiple data radio bearers (DRBs).

At 412, the computer system maps the multiple data message QoS flows to a second multiple DRBs.

At 414, the computer system provides, based on the first multiple DRBs and the second multiple DRBs, one or more services associated with the application to the user device.

In some examples, example system 300 can serve as an emulator of a 5G network (user equipment (UE) <-> channel <-> base station (gNodeB) <-> core). The emulator can be used to emulate and evaluate various mapping combinations to optimize performance and user experience for various types of applications under various types of network architectures and/or scenarios. Once the optimal configuration is obtained from the emulated network, the exact same configuration can be applied to the real 5G Network. Example mapping combinations can include 1) which PDUs can map to which QoS flows, and 2) which QoS flows can map to which DRBs.

In some examples, once the aforementioned mapping combinations are obtained from the emulator, the same mapping combinations can be used in the real-world deployment, for example, as described by the example process 400, to complete a feedback loop.

In some examples, the aforementioned feedback loop can be used either at the design/deployment time (static, done once only) or at the run time (dynamic, in a continuous manner) to optimize the performance and/or dynamically change the mapping combinations.

Figure 5:
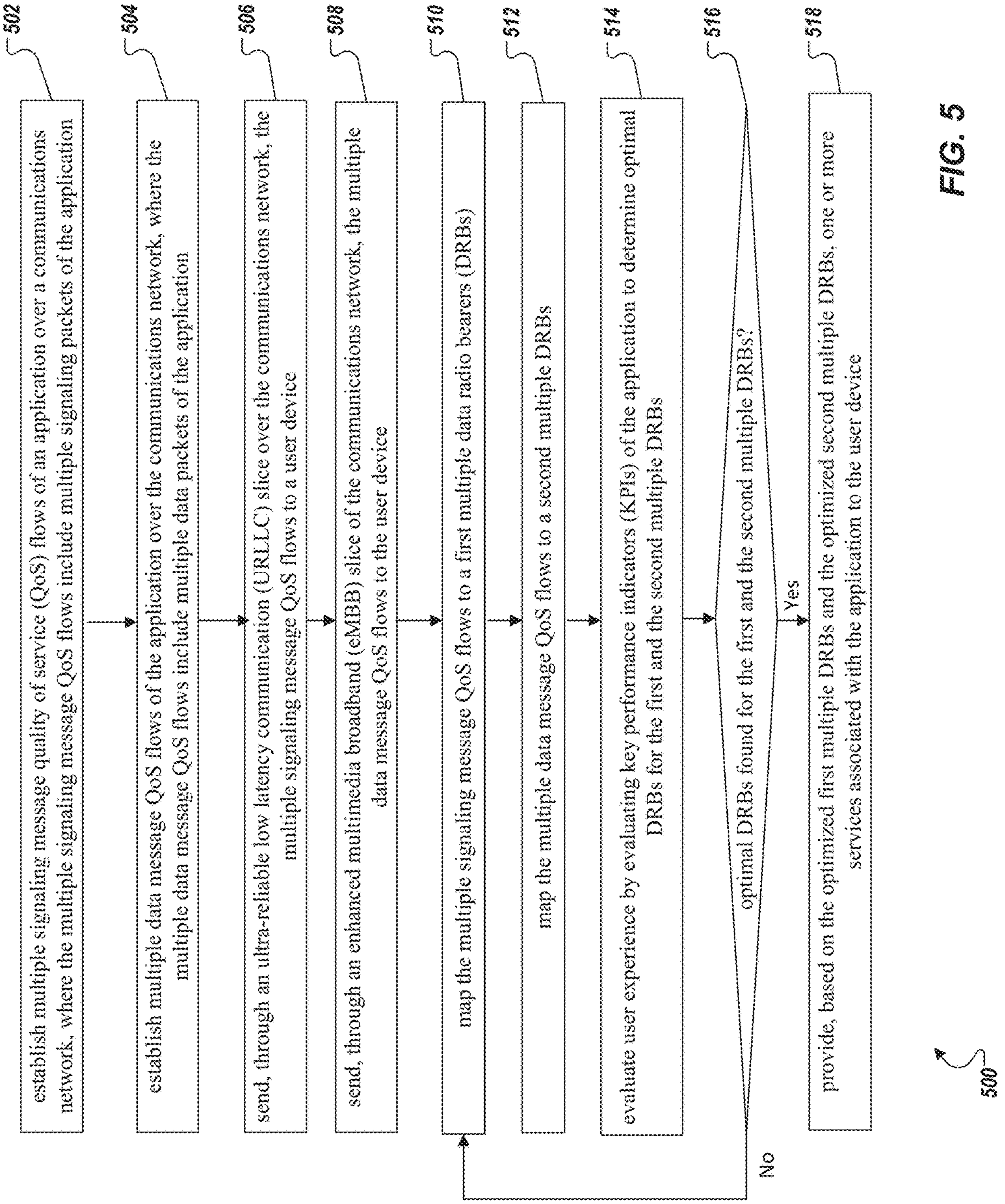
FIG. 5 depicts another example process that can be executed in accordance with implementations of the present disclosure.

FIG. 5 depicts another example process 500 that can be executed in accordance with implementations of the present disclosure. Example process 500 can be used to implement the aforementioned feedback loop using steps 510 through 518 described below.

At 502, a computer system establishes multiple signaling message quality of service (QoS) flows of an application over a communication network, where the multiple signaling message QoS flows include multiple signaling packets of the application.

At 504, the computer system establishes multiple data message QoS flows of the application over the communication network, where the multiple data message QoS flows include multiple data packets of the application.

At 506, the computer system sends, through an ultra-reliable low latency communication (URLLC) slice over the communication network, the multiple signaling message QoS flows to a user device.

At 508, the computer system sends, through an enhanced multimedia broadband (eMBB) slice of the communication network, the multiple data message QoS flows to the user device.

At 510, the computer system maps the multiple signaling message QoS flows to a first multiple data radio bearers (DRBs).

At 512, the computer system maps the multiple data message QoS flows to a second multiple DRBs.

At 514, the computer system evaluates user experience by evaluating key performance indicators (KPIs) of the application to determine optimal DRBs for the first and the second multiple DRBs. For AR/VR applications, example KPIs can include startup time, freezing, and disruptions the user experienced when interacting with the application.

At 516, the computer system determines whether optimal DRBs have been found for the first and the second multiple DRBs. If the optimal DRBs have not been found for the first and the second multiple DRBs, process 500 goes to steps 510 and 512, and the computer system maps the multiple signaling message QoS flows to a different set of the first DRBs, and the multiple data message QoS flows to a different set of the second DRBs. Then the computer system determines whether the latest sets of the first multiple DRBs and the second multiple DRBs are optimal. If the optimal DRBs have been found for the first and the second multiple DRBs, process 500 goes to step 518.

At 518, the computer system provides, based on the optimized first multiple DRBs and the optimized second multiple DRBs, one or more services associated with the application to the user device.

Certain aspects of the subject matter described here can be implemented as a method. Multiple signaling message quality of service (QoS) flows of an application are established over a communications network, where the multiple signaling message QoS flows include multiple signaling packets of the application. Multiple data message QoS flows of the application are established over the communications network, where the multiple data message QoS flows include multiple data packets of the application. The multiple signaling message QoS flows are sent to a user device through an ultra-reliable low latency communication (URLLC) slice over the communications network. The multiple data message QoS flows are sent to the user device through an enhanced multimedia broadband (eMBB) slice of the communications network. The multiple signaling message QoS flows are mapped to a first multiple data radio bearers (DRBs). The multiple data message QoS flows are mapped to a second multiple DRBs. One or more services associated with the application are provided to the user device based on the first multiple DRBs and the second multiple DRBs.

An aspect taken alone or combinable with any other aspect includes the following features. The communications network is a 5G network.

An aspect taken alone or combinable with any other aspect includes the following features. Each of the multiple signaling packets is compliant with multiple 3rd generation partnership project (3GPP) standards.

An aspect taken alone or combinable with any other aspect includes the following features. The communications network is an emulated 5G network.

An aspect taken alone or combinable with any other aspect includes the following features. Mapping the multiple signaling message QoS flows to the first multiple DRBs includes mapping two or more signaling message QoS flows in the multiple signaling message QoS flows to a data radio bearer (DRB) in the first plurality of DRBs.

An aspect taken alone or combinable with any other aspect includes the following features. Mapping the multiple signaling message QoS flows to the first multiple DRBs and mapping the multiple data message QoS flows to the second multiple DRBs include determining the first multiple DRBs and the second multiple DRBs based on multiple key performance indicators (KPIs) of the application.

An aspect taken alone or combinable with any other aspect includes the following features. Establishing the multiple signaling message QoS flows of the application over the communications network includes mapping one or more signaling flows of the application to a signaling message QoS flow of the multiple signaling message QoS flows, and establishing the multiple data message QoS flows of the application over the communications network includes mapping one or more data flows of the application to a data message QoS flow of the multiple data message QoS flows.

Certain aspects of the subject matter described in this disclosure can be implemented as a non-transitory computer-readable medium storing instructions which, when executed by a hardware-based processor perform operations including the methods described here.

Certain aspects of the subject matter described in this disclosure can be implemented as a computer-implemented system that includes one or more processors including a hardware-based processor, and a memory storage including a non-transitory computer-readable medium storing instructions which, when executed by the one or more processors performs operations including the methods described here.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method executable by one or more processors, the method comprising:

establishing a plurality of signaling message quality of service (QoS) flows of an application over a communications network, wherein the plurality of signaling message QoS flows comprise a plurality of signaling packets of the application, wherein establishing the plurality of signaling message QoS flows of the application over the communications network comprises mapping one or more signaling flows of the application to a signaling message QoS flow of the plurality of signaling message QoS flows, wherein the one or more signaling flows of the application include at least one of real-time streaming protocol (RTSP) control, game control, mixed reality technologies state and haptics;

establishing a plurality of data message QoS flows of the application over the communications network, the plurality of data message QoS flows of the application is different than the plurality of signaling message QoS flows, wherein the plurality of data message QoS flows comprise a plurality of data packets of the application, wherein establishing the plurality of data message QoS flows of the application over the communications network comprises mapping one or more data flows of the application to a data message QoS flow of the plurality of data message QoS flows, wherein the one or more data flows of the application includes audio and video data associated with the application;

sending, through an ultra-reliable low latency communication (URLLC) slice over the communications network, the plurality of signaling message QoS flows to a user device;

sending, through an enhanced multimedia broadband (eMBB) slice of the communications network, the plurality of data message QoS flows to the user device;

mapping the plurality of signaling message QoS flows to a first plurality of data radio bearers (DRBs);

mapping the plurality of data message QoS flows to a second plurality of DRBs;

wherein mapping the plurality of signaling message QoS flows to the first plurality of DRBs and mapping the plurality of data message QoS flows to the second plurality of DRBs comprise determining the first plurality of DRBs and the second plurality of DRBs based on a plurality of key performance indicators (KPIs) of the application, and wherein the plurality of KPI of the application includes startup time, freezing, and disruptions a user experienced when interacting with the application; and providing, based on the first plurality of DRBs and the second plurality of DRBs, one or more services associated with the application to the user device.

2. The computer-implemented method of claim 1, wherein the communications network is a 5G network.

3. The computer-implemented method of claim 1, wherein each of the plurality of signaling packets is compliant with a plurality of 3rd generation partnership project (3GPP) standards.

4. The computer-implemented method of claim 1, wherein the communications network is an emulated 5G network.

5. The computer-implemented method of claim 1, wherein mapping the plurality of signaling message QoS flows to the first plurality of DRBs comprises mapping two or more signaling message QoS flows in the plurality of signaling message QoS flows to a data radio bearer (DRB) in the first plurality of DRBs.

6. A non-transitory computer-readable medium storing one or more instructions executable by a computer system to perform operations comprising:

establishing a plurality of signaling message quality of service (QoS) flows of an application over a communications network, wherein the plurality of signaling message QoS flows comprise a plurality of signaling packets of the application, wherein establishing the plurality of signaling message QoS flows of the application over the communications network comprises mapping one or more signaling flows of the application to a signaling message QoS flow of the plurality of signaling message QoS flows, wherein the one or more signaling flows of the application include at least one of real-time streaming protocol (RTSP) control, game control, mixed reality technologies state and haptics;

establishing a plurality of data message QoS flows of the application over the communications network, the plurality of data message QoS flows of the application is different than the plurality of signaling message QoS flows, wherein the plurality of data message QoS flows comprise a plurality of data packets of the application, wherein establishing the plurality of data message QoS flows of the application over the communications network comprises mapping one or more data flows of the application to a data message QoS flow of the plurality of data message QoS flows, wherein the one or more data flows of the application includes audio and video data associated with the application;

sending, through an ultra-reliable low latency communication (URLLC) slice over the communications network, the plurality of signaling message QoS flows to a user device;

sending, through an enhanced multimedia broadband (eMBB) slice of the communications network, the plurality of data message QoS flows to the user device;

mapping the plurality of signaling message QoS flows to a first plurality of data radio bearers (DRBs);

mapping the plurality of data message QoS flows to a second plurality of DRBs;

wherein mapping the plurality of signaling message QoS flows to the first plurality of DRBs and mapping the plurality of data message QoS flows to the second plurality of DRBs comprise determining the first plurality of DRBs and the second plurality of DRBs based on a plurality of key performance indicators (KPIs) of the application, and wherein the plurality of KPI of the application includes startup time, freezing, and disruptions a user experienced when interacting with the application; and providing, based on the first plurality of DRBs and the second plurality of DRBs, one or more services associated with the application to the user device.

7. The non-transitory computer-readable medium of claim 6, wherein the communications network is a 5G network.

8. The non-transitory computer-readable medium of claim 6, wherein each of the plurality of signaling packets is compliant with a plurality of 3rd generation partnership project (3GPP) standards.

9. The non-transitory computer-readable medium of claim 6, wherein the communications network is an emulated 5G network.

10. The non-transitory computer-readable medium of claim 6, wherein mapping the plurality of signaling message QoS flows to the first plurality of DRBs comprises mapping two or more signaling message QoS flows in the plurality of signaling message QoS flows to a data radio bearer (DRB) in the first plurality of DRBs.

11. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

establishing a plurality of signaling message quality of service (QoS) flows of an application over a communications network, wherein the plurality of signaling message QoS flows comprise a plurality of signaling packets of the application;

wherein establishing the plurality of signaling message QoS flows of the application over the communications network comprises mapping one or more signaling flows of the application to a signaling message QoS flow of the plurality of signaling message QoS flows, wherein the one or more signaling flows of the application include at least one of real-time streaming protocol (RTSP) control, game control, mixed reality technologies state and haptics;

establishing a plurality of data message QoS flows of the application over the communications network, the plurality of data message QoS flows of the application is different than the plurality of signaling message QoS flows, wherein the plurality of data message QoS flows comprise a plurality of data packets of the application, wherein establishing the plurality of data message QoS flows of the application over the communications network comprises mapping one or more data flows of the application to a data message QoS flow of the plurality of data message QoS flows, wherein the one or more data flows of the application includes audio and video data associated with the application;

sending, through an ultra-reliable low latency communication (URLLC) slice over the communications network, the plurality of signaling message QoS flows to a user device;

sending, through an enhanced multimedia broadband (eMBB) slice of the communications network, the plurality of data message QoS flows to the user device;

mapping the plurality of signaling message QoS flows to a first plurality of data radio bearers (DRBs);

mapping the plurality of data message QoS flows to a second plurality of DRBs;

wherein mapping the plurality of signaling message QoS flows to the first plurality of DRBs and mapping the plurality of data message QoS flows to the second plurality of DRBs comprise determining the first plurality of DRBs and the second plurality of DRBs based on a plurality of key performance indicators (KPIs) of the application, and wherein the plurality of KPI of the application includes startup time, freezing, and disruptions a user experienced when interacting with the application; and providing, based on the first plurality of DRBs and the second plurality of DRBs, one or more services associated with the application to the user device.

12. The computer-implemented system of claim 11, wherein the communications network is a 5G network.

13. The computer-implemented system of claim 11, wherein each of the plurality of signaling packets is compliant with a plurality of 3rd generation partnership project (3GPP) standards.

14. The computer-implemented system of claim 11, wherein mapping the plurality of signaling message QoS flows to the first plurality of DRBs comprises mapping two or more signaling message QoS flows in the plurality of signaling message QoS flows to a data radio bearer (DRB) in the first plurality of DRBs.

15. The method of claim 2, further comprising performing signaling with corresponding virtual network functions (VNFs) to set up the plurality of signaling message QoS flows and the plurality of data message QoS flows through the 5G network.

16. The method of claim 2, further comprising deploying a smart agent between an AR/VR device and an edge server, wherein the smart agent acts as a proxy between the AR/VR device and the edge server to relay plurality of signaling message QoS flows and the plurality of data message QoS flows between the AR/VR device and the edge server over the 5G network.

17. The non-transitory computer-readable medium of claim 7, further comprising performing signaling with corresponding virtual network functions (VNFs) to set up the plurality of signaling message QoS flows and the plurality of data message QoS flows through the 5G network.

18. The non-transitory computer-readable medium of claim 7, further comprising deploying a smart agent between an AR/VR device and an edge server, wherein the smart agent acts as a proxy between the AR/VR device and the edge server to relay plurality of signaling message QoS flows and the plurality of data message QoS flows between the AR/VR device and the edge server over the 5G network.

19. The computer-implemented system of claim 12, further comprising performing signaling with corresponding virtual network functions (VNFs) to set up the plurality of signaling message QoS flows and the plurality of data message QoS flows through the 5G network.

20. The computer-implemented system of claim 12, further comprising deploying a smart agent between an AR/VR device and an edge server, wherein the smart agent acts as a proxy between the AR/VR device and the edge server to relay plurality of signaling message QoS flows and the plurality of data message QoS flows between the AR/VR device and the edge server over the 5G network.

* * * * *